United States Patent
Jeong

(10) Patent No.: US 11,423,643 B1
(45) Date of Patent: Aug. 23, 2022

(54) METHOD FOR GENERATING OBFUSCATED IMAGE TO BE USED IN TRAINING LEARNING NETWORK AND LABELING DEVICE USING THE SAME

(71) Applicant: Deeping Source Inc., Seoul (KR)

(72) Inventor: Jong Hu Jeong, Seoul (KR)

(73) Assignee: DEEPING SOURCE INC., Seoul (KR)

(*) Notice: Subject to any disclaimer, the term of this patent is extended or adjusted under 35 U.S.C. 154(b) by 0 days.

(21) Appl. No.: 17/720,520

(22) Filed: Apr. 14, 2022

(30) Foreign Application Priority Data

Nov. 29, 2021 (KR) .......................... 10-2021-0167792

(51) Int. Cl.
*G06V 10/774* (2022.01)
*G06F 21/62* (2013.01)
*G06N 3/08* (2006.01)

(52) U.S. Cl.
CPC ........ *G06V 10/774* (2022.01); *G06F 21/6245* (2013.01); *G06N 3/08* (2013.01)

(58) Field of Classification Search
CPC ..... G06V 10/774; G06F 21/6245; G06N 3/08
See application file for complete search history.

(56) References Cited

U.S. PATENT DOCUMENTS

| | | | | |
|---|---|---|---|---|
| 10,535,120 B2* | 1/2020 | Edwards | .............. | G06N 3/0472 |
| 10,621,378 B1* | 4/2020 | Kim | .................... | G06F 21/6245 |
| 10,621,379 B1* | 4/2020 | Kim | .................... | G06F 21/6254 |
| 10,699,192 B1* | 6/2020 | Kim | .................... | G06N 7/005 |
| 11,017,319 B1* | 5/2021 | Kim | .................... | G06F 21/14 |
| 11,017,320 B1* | 5/2021 | Kim | .................... | G06N 20/00 |
| 11,023,777 B1* | 6/2021 | Koo | .................... | G06N 3/0454 |
| 11,164,046 B1* | 11/2021 | Kim | .................... | G06N 3/08 |
| 11,200,342 B1* | 12/2021 | Kim | .................... | G06V 20/52 |
| 11,200,494 B1* | 12/2021 | Kim | .................... | G06N 3/08 |
| 11,244,248 B1* | 2/2022 | Kim | .................... | G06K 9/6259 |
| 11,308,359 B1* | 4/2022 | Jeong | .................. | G06N 3/0454 |
| 11,334,773 B2* | 5/2022 | Yadav | .................... | G06N 20/00 |
| 2014/0362163 A1* | 12/2014 | Winterstein | .......... | H04N 7/141 |
| | | | | 348/14.07 |
| 2016/0316097 A1* | 10/2016 | Lineweber | .......... | H04N 1/4493 |
| 2017/0317983 A1* | 11/2017 | Kompalli | .............. | G06V 30/40 |
| 2018/0293924 A1* | 10/2018 | Wang | ..................... | G09G 3/20 |
| 2019/0188830 A1* | 6/2019 | Edwards | .............. | G06N 3/0472 |

(Continued)

*Primary Examiner* — Aaron W Carter
(74) *Attorney, Agent, or Firm* — Amster, Rothstein & Ebenstein LLP

(57) ABSTRACT

A training image to be used in training a learning network is generated. The method of generating the training image includes steps of: (a) a labeling device, in response to acquiring an original image, (i) inputting the original image into an image recognition network to detect privacy-related regions from the original image, (ii) adding dummy regions, different from the detected privacy-related regions, onto the original image, and (iii) setting the privacy-related regions and the dummy regions as obfuscation-expected regions which represent regions to be obfuscated in the original image; (b) the labeling device generating an obfuscated image by obfuscating the obfuscation-expected regions; and (c) the labeling device labeling the obfuscated image to be corresponding to a task of the learning network to be trained, to thereby generate the training image to be used in training the learning network.

20 Claims, 11 Drawing Sheets

(56) References Cited

U.S. PATENT DOCUMENTS

2020/0034520 A1\* 1/2020 Kim ................. G06N 3/0454
2020/0034565 A1\* 1/2020 Kim ................. G06N 3/0481
2021/0357688 A1\* 11/2021 Kearney ............ G06V 10/82

\* cited by examiner

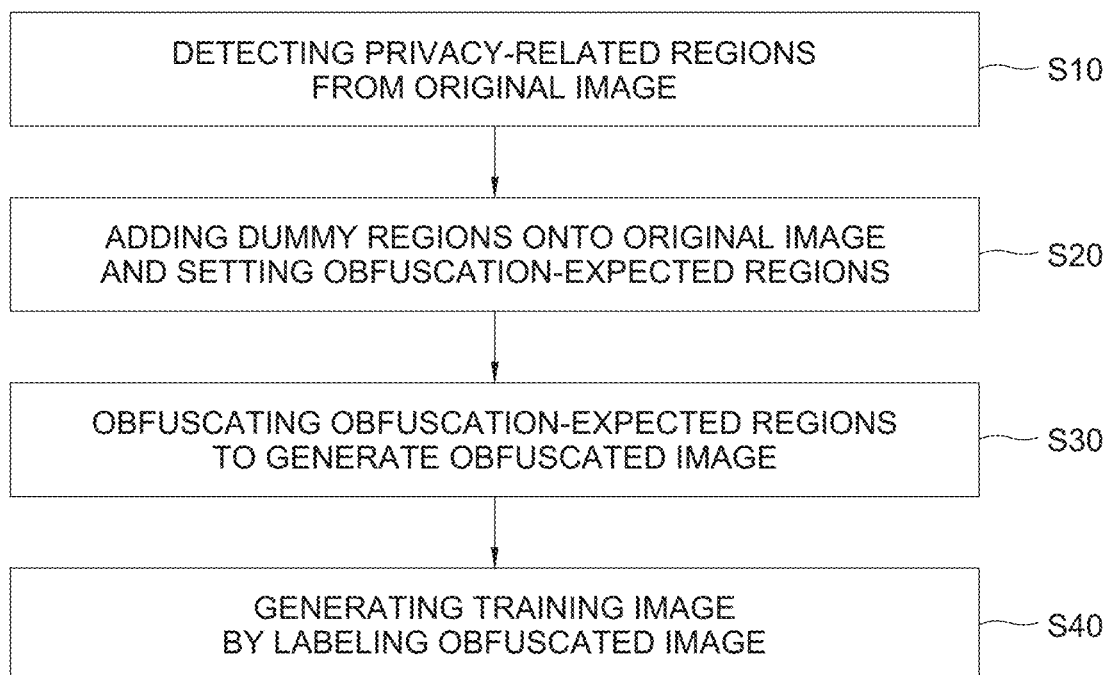

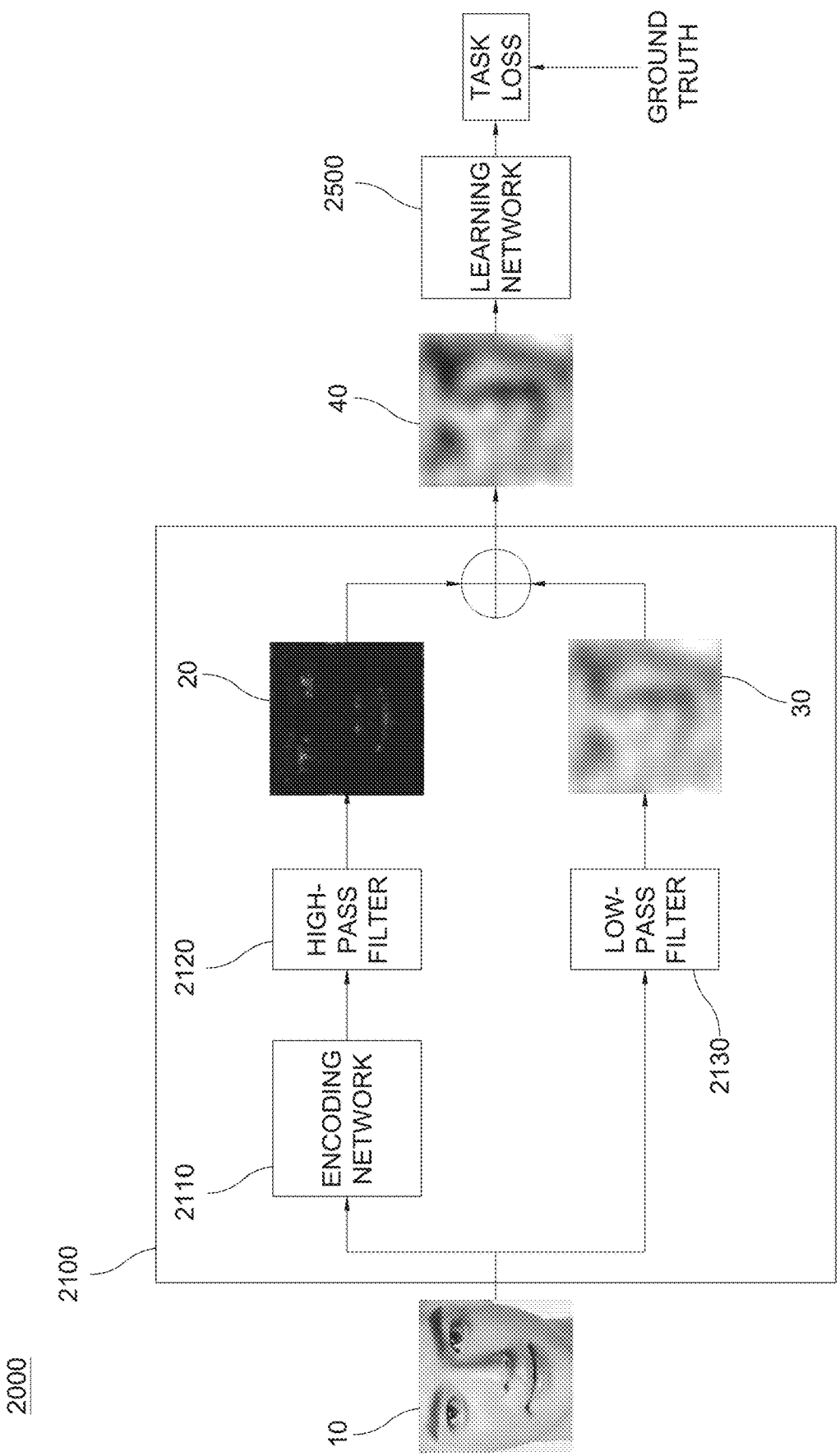

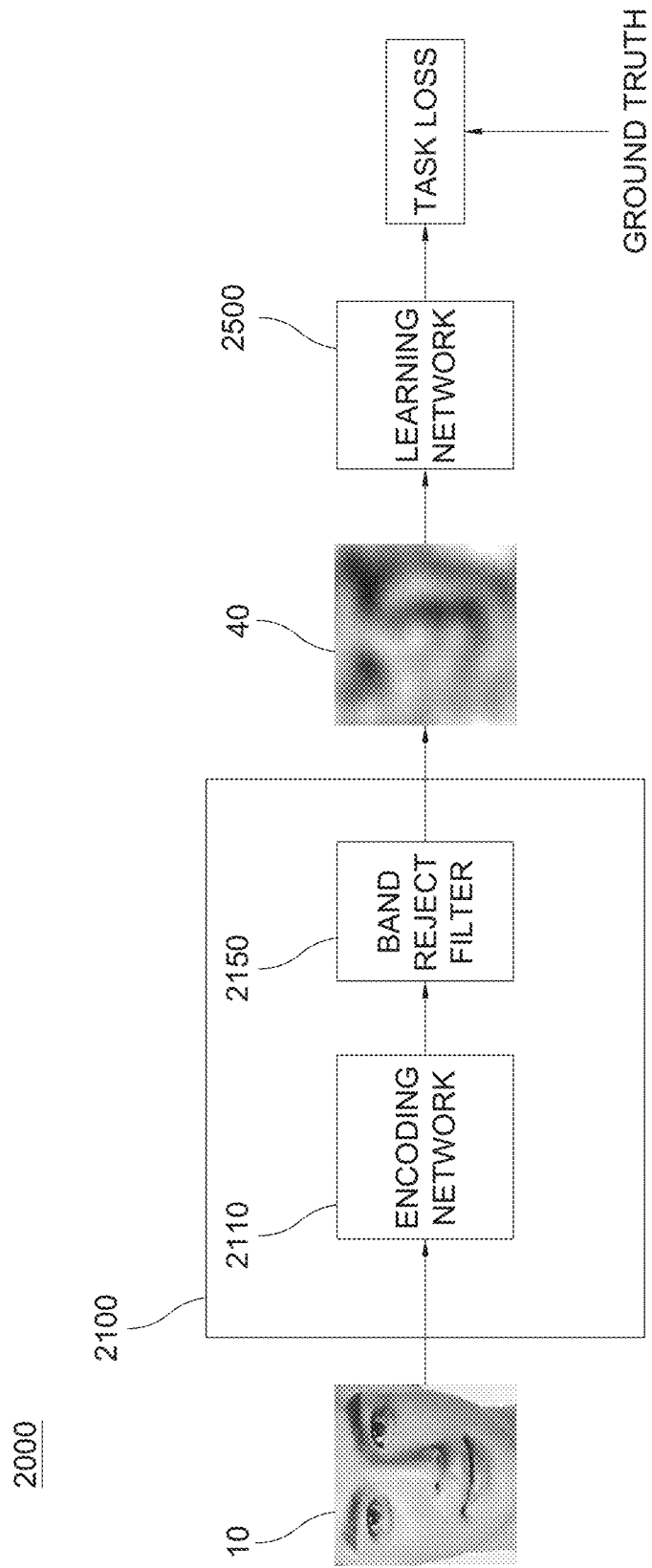

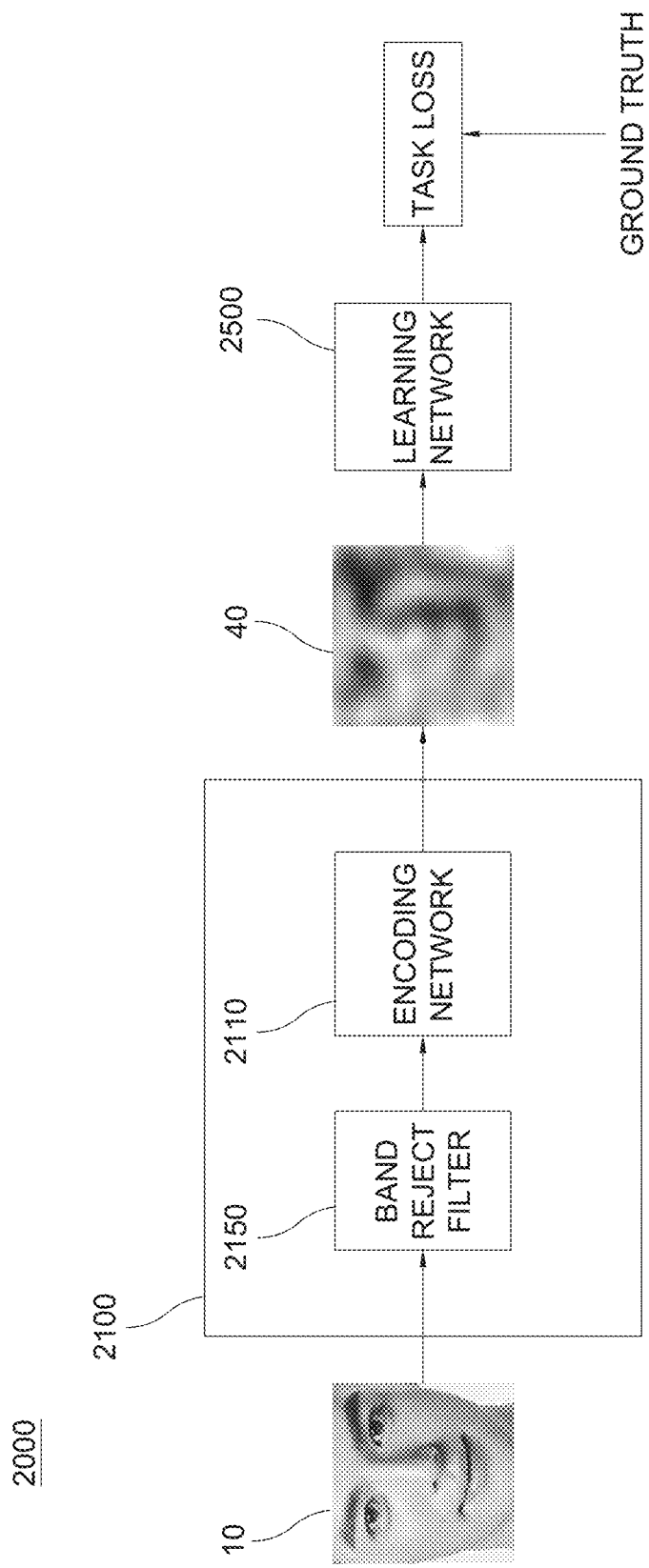

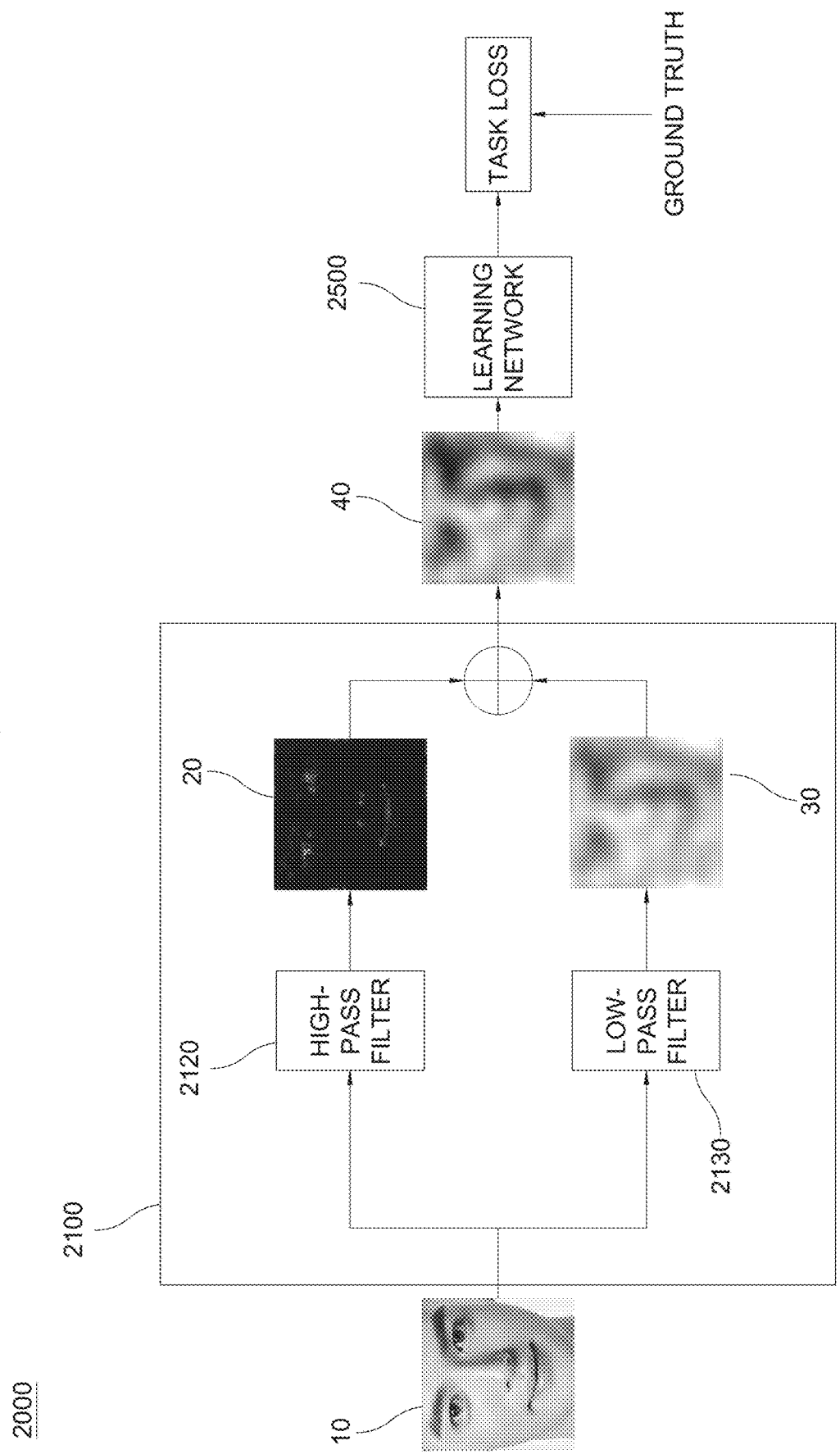

METHOD FOR GENERATING OBFUSCATED IMAGE TO BE USED IN TRAINING LEARNING NET WORK AND LABELING DEVICE USING THE SAME

CROSS REFERENCE TO RELATED APPLICATION

This application claims the benefit of priority to Korean Provisional Patent Application No. 10-2021-0167792, filed on Nov. 29, 2021, the entire contents of which being incorporated herein by reference.

FIELD OF THE DISCLOSURE

The present disclosure relates to a method for generating an obfuscated image, e.g., an anonymized image or a concealed image, to be used in training a learning network and a labeling device using the same; and more particularly, to the method for generating the obfuscated image with one or more privacy-related regions therein being obfuscated and the labeling device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, voice data, as well as all of structured data used by conventional enterprises or public institutions. Data as such is referred to as the big data in the sense that common software tools and computer systems cannot easily handle such a huge volume of data.

And, although such a big data may carry no meaning by itself, it can be useful for generating new data, judging or predicting in various fields through machine learning on patterns and the like.

Recently, due to the strengthening of privacy protection acts, it is required to delete information that can be used for identifying individuals from the data or to obtain consent from the individuals in order to trade or share such a big data. However, it is not easy to check whether any information that can be used for identifying the individuals is present among such a large amount of big data, and it is impossible to obtain the consent from every individual. Therefore, various techniques for such purposes have emerged.

As an example of a related prior art, a technique is disclosed in Korean Patent Registration No. 1861520. According to this technique, a face-concealing method, e.g., a face-anonymizing method, is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, where the second image is generated to have a facial shape different from that of the facial region detected in the detection step.

However, if a user learning network is trained with obfuscated images (serving as training images) which are obfuscated, e.g., anonymized, concealed, according to conventional techniques as well the technique described above, there is a problem in that the user learning network may not operate correctly if original images are inputted thereto.

That is, when the training images are generated by labeling the obfuscated images according to the conventional techniques, correlations between obfuscated parts and labels are inevitable. Therefore when such obfuscated images are used to train a learning network, the learning network may be trained to get correct answers in response to finding out the obfuscated parts, and accordingly the trained learning network has a problem in not being able to get the correct answer from the original images where the obfuscated parts are not included.

Accordingly, the applicant(s) of the present disclosure proposes a method for generating the obfuscated images as the training images such that the trained learning network trained by using the obfuscated images may operate correctly even with the original images.

SUMMARY OF THE DISCLOSURE

It is an object of the present disclosure to solve all the aforementioned problems.

It is another object of the present disclosure to generate at least one training image to be used in training a learning network.

It is still another object of the present disclosure to generate at least one obfuscated training image, e.g., at least one anonymized training image, at least one concealed training image, to be used in training the learning network such that the learning network operates correctly even with at least one original image.

It is still yet another object of the present disclosure to generate the training image to be used in training the learning network to operate correctly, regardless of whether obfuscated parts are included.

In order to accomplish objects above, representative structures of the present disclosure are described as follows:

In accordance to one aspect of the present disclosure there is provided a method for generating at least one training image to be used in training a learning network, including steps of: (a) a labeling device, in response to acquiring at least one original image, (i) inputting the original image into an image recognition network, to thereby instruct the image recognition network to detect one or more privacy-related regions from the original image, (ii) adding one or more dummy regions, different from the detected privacy-related regions, onto the original image, and (iii) setting the privacy-related regions and the dummy regions as obfuscation-expected regions which represent regions to be obfuscated in the original image; (b) the labeling device generating at least one obfuscated image by obfuscating the obfuscation-expected regions; and (c) the labeling device labeling the obfuscated image to be corresponding to a task of the learning network to be trained, to thereby generate the training image to be used in training the learning network.

As one example, the method further includes steps of: (d) the labeling device training the learning network using the training image by performing either of processes of (i) (i-1) inputting the training image to the learning network, to thereby instruct the learning network to perform a learning operation on the training image and thus output first characteristic information to be corresponding to the task, (i-2) generating a task loss by referring to the first characteristic information and its corresponding ground truth or a first task-specific output, generated by using the first characteristic information, and its corresponding ground truth, and (i-3) training the learning network through a backpropagation of the task loss, and processes of (ii) (ii-1) transmitting the training image to a learning device, to thereby instruct the learning device to input the training image into the learning network to perform the learning operation on the training image and thus acquire the first characteristic information, (ii-2) generating the task loss by referring to the first characteristic information and its corresponding ground truth or the first task-specific output, generated by using the first characteristic information, and its corresponding ground truth, and (ii-3) training the learning network through a backpropagation of the task loss; and (e) the labeling device evaluating a trained learning network using the original image by performing either of processes of (i) (i-1) inputting the original image to the trained learning network, to thereby instruct the trained learning network to perform the learning operation on the original image and thus output second characteristic information to be corresponding to the task, and (i-2) evaluating the trained learning network by referring to the second characteristic information and its corresponding ground truth or a second task-specific output, generated by using the second characteristic information, and its corresponding ground truth, and processes of (ii) (ii-1) transmitting the original image to the learning device, to thereby instruct the learning device to input the original image into the trained learning network to perform the learning operation on the original image and thus acquire the second characteristic information, and (ii-2) evaluating the trained learning network by referring to the second characteristic information and its corresponding ground truth or the second task-specific output, generated by using the second characteristic information, and its corresponding ground truth.

As one example, at the step of (a), the labeling device adds the dummy regions onto the original image by performing either of a process of (i) adding the dummy regions onto one or more random locations randomly chosen within the original image and a process of (ii) adding the dummy regions onto one or more fixed locations determined gridwise within the original image.

As one example, a specific dummy region among the dummy regions is located by at least a predetermined distance from one or more labels generated by labeling the obfuscated image at the step of (c).

As one example, at the step of (b), the labeling device performs at least one of a blanking process, a pixelizing process, a circle process, a blurring process, and a box process on the obfuscation-expected regions by using obfuscation algorithm, to thereby obfuscate the obfuscation-expected regions.

As one example, at the step of (b), the labeling device generates the obfuscated image by performing either of processes of (i) inputting the original image being set with the obfuscation-expected regions into an obfuscation network, to thereby instruct the obfuscation network to filter frequency of the obfuscation-expected regions of the original image and thus generate the obfuscated image, processes of (ii) (ii-1) cropping each of the obfuscation-expected regions of the original image to generate each of cropped images, (ii-2) inputting the cropped images into the obfuscation network to thereby instruct the obfuscation network to filter frequency of each of cropped images and thus generate each of cropped obfuscated images, and (ii-3) compositing each of the obfuscation-expected regions with each of cropped obfuscated images to thus generate the obfuscated image.

As one example, the labeling device inputs the original image being set with the obfuscation-expected regions or the cropped images into the obfuscation network, to thereby instruct the obfuscation network to (i) generate each of encoded images by encoding each of the obfuscation-expected regions in the original image or each of the cropped images through an encoding network, (ii) generate high-frequency images by only allowing high-frequency regions in the encoded images to pass through a high-pass filter, (iii) generate low-frequency images by only allowing low-frequency regions in each of the obfuscation-expected regions to pass through a low-pass filter, and (iv) concatenate the high-frequency images and the low-frequency images, thereby obfuscating each of the obfuscation-expected regions.

As one example, the labeling device inputs the original image being set with the obfuscation-expected regions or the cropped images into the obfuscation network, to thereby instruct the obfuscation network to (i) generate high-frequency images by only allowing high-frequency regions in each of the obfuscation-expected regions of the original image or each of the cropped images to pass through a high-pass filter, (ii) generate low-frequency images by only allowing low-frequency regions in each of the obfuscation-expected regions to pass through a low-pass filter, and (iii) concatenate the high-frequency images and the low-frequency images, thereby obfuscating each of the obfuscation-expected regions.

As one example, the labeling device inputs the original image being set with the obfuscation-expected regions or the cropped images into the obfuscation network, to thereby instruct the obfuscation network to (i) generate encoded images by encoding each of the obfuscation-expected regions in the original image or each of the cropped images through an encoding network, and (ii) remove one or more predetermined frequency bands in each of the encoded images through a band reject filter, thereby obfuscating each of the obfuscation-expected regions.

As one example, the labeling device inputs the original image being set with the obfuscation-expected regions or the cropped images into the obfuscation network, to thereby instruct the obfuscation network to (i) generate frequency-obfuscated images by removing one or more predetermined frequency bands in each of the obfuscation-expected regions of the original images or each of the cropped images through a band reject filter, and (ii) encode the frequency-obfuscated images through an encoding network, thereby obfuscating each of the obfuscation-expected regions.

In accordance with another aspect of the present disclosure there is provided a labeling device for generating at least one training image to be used in training a learning network, including: at least one memory that stores instructions; and at least one processor configured to execute the instructions to perform: processes of (I) in response to acquiring at least one original image, (i) inputting the original image into an image recognition network, to thereby instruct the image recognition network to detect one or more privacy-related regions from the original image, (ii) adding one or more dummy regions, different from the detected privacy-related regions, onto the original image, and (iii) setting the privacy-related regions and the dummy regions as obfuscation-expected regions which represent regions to be obfuscated in the original image; (II) generating at least one obfuscated image by obfuscating the obfuscation-expected regions; and (III) labeling the obfuscated image to be corresponding to a task of the learning network to be trained, to thereby generate the training image to be used in training the learning network.

As one example, the processor further performs processes of (IV) training the learning network using the training image by performing either of processes of (i) (i-1) inputting the training image to the learning network, to thereby instruct the learning network to perform a learning operation on the training image and thus output first characteristic information to be corresponding to the task, (i-2) generating a task loss by referring to the first characteristic information and its corresponding ground truth or a first task-specific output, generated by using the first characteristic information, and its corresponding ground truth, and (i-3) training the learning network through a backpropagation of the task loss, and processes of (ii) (ii-1) transmitting the training image to a learning device, to thereby instruct the learning device to input the training image into the learning network to perform the learning operation on the training image and thus acquire the first characteristic information, (ii-2) generating the task loss by referring to the first characteristic information and its corresponding ground truth or the first task-specific output, generated by using the first characteristic information, and its corresponding ground truth, and (ii-3) training the learning network through a backpropagation of the task loss; and (V) evaluating a trained learning network using the original image by performing either of processes of (i) (i-1) inputting the original image to the trained learning network, to thereby instruct the trained learning network to perform the learning operation on the original image and thus output second characteristic information to be corresponding to the task, and (i-2) evaluating the trained learning network by referring to the second characteristic information and its corresponding ground truth or a second task-specific output, generated by using the second characteristic information, and its corresponding ground truth, and processes of (ii) (ii-1) transmitting the original image to the learning device, to thereby instruct the learning device to input the original image into the trained learning network to perform the learning operation on the original image and thus acquire the second characteristic information, and (ii-2) evaluating the trained learning network by referring to the second characteristic information and its corresponding ground truth or the second task-specific output, generated by using the second characteristic information, and its corresponding ground truth.

As one example, the processor, at the process of (I), adds the dummy regions onto the original image by performing either of a process of (i) adding the dummy regions onto one or more random locations randomly chosen within the original image and a process of (ii) adding the dummy regions onto one or more fixed locations determined gridwise within the original image.

As one example, a specific dummy region among the dummy regions is located by at least a predetermined distance from one or more labels generated by labeling the obfuscated image at the process of (III).

As one example, the processor, at the process of (II), performs at least one of a blanking process, a pixelizing process, a circle process, a blurring process, and a box process on the obfuscation-expected regions by using obfuscation algorithm, to thereby obfuscate the obfuscation-expected regions.

As one example, the processor, at the process of (II), generates the obfuscated image by performing either of processes of (i) inputting the original image being set with the obfuscation-expected regions into an obfuscation network, to thereby instruct the obfuscation network to filter frequency of the obfuscation-expected regions of the original image and thus generate the obfuscated image, processes of (ii) (ii-1) cropping each of the obfuscation-expected regions of the original image to generate each of cropped images, (ii-2) inputting the cropped images into the obfuscation network to thereby instruct the obfuscation network to filter frequency of each of cropped images and thus generate each of cropped obfuscated images, and (ii-3) compositing each of the obfuscation-expected regions with each of cropped obfuscated images to thus generate the obfuscated image.

As one example, the processor inputs the original image being set with the obfuscation-expected regions or the cropped images into the obfuscation network, to thereby instruct the obfuscation network to (i) generate each of encoded images by encoding each of the obfuscation-expected regions in the original image or each of the cropped images through an encoding network, (ii) generate high-frequency images by only allowing high-frequency regions in the encoded images to pass through a high-pass filter, (iii) generate low-frequency images by only allowing low-frequency regions in each of the obfuscation-expected regions to pass through a low-pass filter, and (iv) concatenate the high-frequency images and the low-frequency images, thereby obfuscating each of the obfuscation-expected regions.

As one example, the processor inputs the original image being set with the obfuscation-expected regions or the cropped images into the obfuscation network, to thereby instruct the obfuscation network to (i) generate high-frequency images by only allowing high-frequency regions in each of the obfuscation-expected regions of the original image or each of the cropped images to pass through a high-pass filter, (ii) generate low-frequency images by only allowing low-frequency regions in each of the obfuscation-expected regions to pass through a low-pass filter, and (iii) concatenate the high-frequency images and the low-frequency images, thereby obfuscating each of the obfuscation-expected regions.

As one example, the processor inputs the original image being set with the obfuscation-expected regions or the cropped images into the obfuscation network, to thereby instruct the obfuscation network to (i) generate encoded images by encoding each of the obfuscation-expected regions in the original image or each of the cropped images through an encoding network, and (ii) remove one or more predetermined frequency bands in each of the encoded images through a band reject filter, thereby obfuscating each of the obfuscation-expected regions.

As one example, the processor inputs the original image being set with the obfuscation-expected regions or the cropped images into the obfuscation network, to thereby instruct the obfuscation network to (i) generate frequency-obfuscated images by removing one or more predetermined frequency bands in each of the obfuscation-expected regions of the original images or each of the cropped images through a band reject filter, and (ii) encode the frequency-obfuscated images through an encoding network, thereby obfuscating each of the obfuscation-expected regions.

In addition, recordable media that are readable by a computer for storing a computer program to execute the method of the present disclosure is further provided.

BRIEF DESCRIPTION OF THE DRAWINGS

The following drawings to be used for explaining example embodiments of the present disclosure are only part of example embodiments of the present disclosure and other drawings can be acquired based on the drawings by those skilled in the art of the present disclosure without inventive work.

FIG. 2 is a drawing schematically illustrating a method for generating the obfuscated image to be used in training the learning network in accordance with one example embodiment of the present disclosure.

FIGS. 4 to 7 are drawings schematically illustrating a method of training an obfuscation network capable of obfuscating an original image in the method of generating the obfuscated image for training the learning network in accordance with one example embodiment of the present disclosure.

DETAILED DESCRIPTION OF THE PREFERRED EMBODIMENTS

Figure 1:
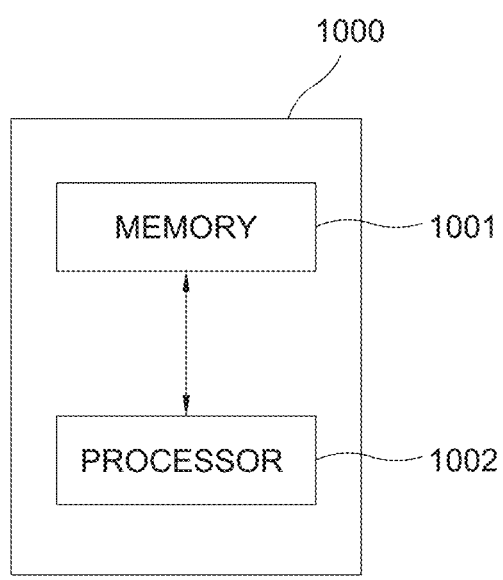
FIG. 1 is a drawing schematically illustrating a labeling device for generating at least one obfuscated image, e.g., at least one anonymized image, at least one concealed image, to be used in training a learning network in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating a labeling device for generating an obfuscated image to be used in training a learning network in accordance with one example embodiment of the present disclosure.

Referring to FIG. 1, the labeling device 1000 may include a memory 1001 to store instructions for generating at least one obfuscated image to be used in training the learning network and a processor 1002 for performing processes of generating the obfuscated image to be used in training the learning network according to the instructions stored in the memory 1001 in accordance with one example embodiment of the present disclosure.

Specifically, the labeling device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific manner as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

A method for generating the obfuscated image to be used in training the learning network by using the labeling device 1000 in accordance with one example embodiment of the present disclosure is explained by referring to FIG. 2.

First, in response to acquiring at least one original image, the labeling device 1000 may input the original image into an image recognition network, to thereby allow the image recognition network to detect one or more privacy-related regions from the original image, at a step of S10.

Herein, the privacy-related regions may be areas such an individual's face or texts showing personal information related to the individual being shown, but the present disclosure is not limited thereto, and may be certain regions which expose the personal information of the individual or a group of individuals within the original image. Also, since there is risk of these privacy-related regions being exposed depending on a disclosure of the original image, the privacy-related regions may be regions requiring de-identification processing in order to protect the personal information.

Moreover, the image recognition network may be based on a deep learning and may detect the privacy-related regions from an image. In detail, the image recognition network may be configured as various deep learning networks such as an object detector for object detection, e.g., faces, etc. and a character recognizer for character recognition.

Figure 3A:
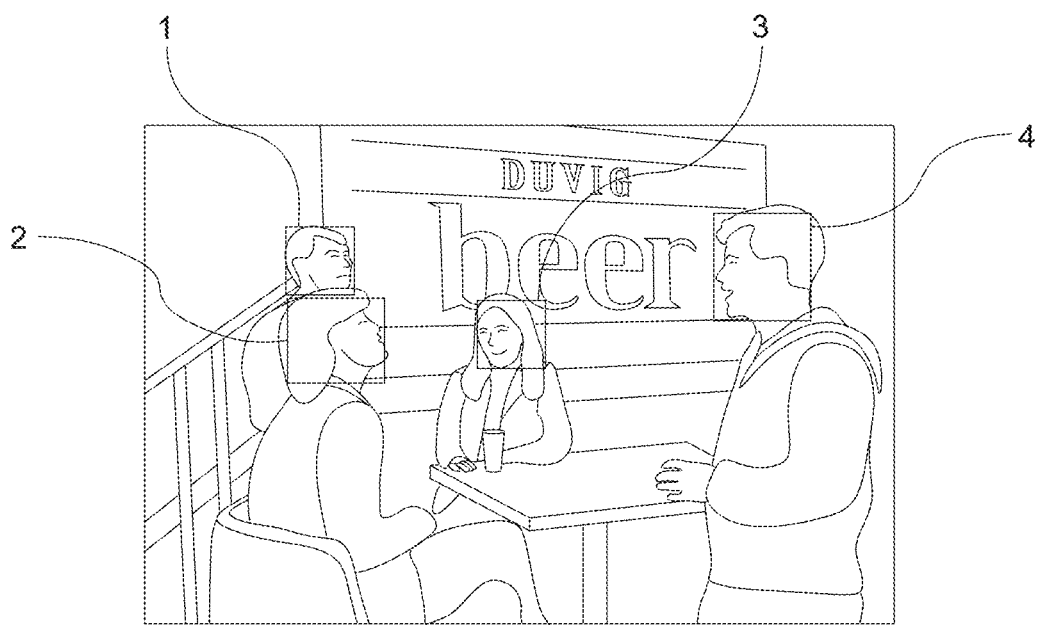
FIGS. 3A to 3E are drawings schematically illustrating states of images according to the method for generating the obfuscated image to be used in training the learning network in accordance with one example embodiment of the present disclosure.

For example, according to FIG. 3A, the labeling device 1000 may input the original image into the deep learning-based object detector, to thereby instruct the deep learning-based object detector to detect one or more faces, generate one or more bounding boxes 1, 2, 3, and 4 corresponding to the detected faces, and thus set the bounding boxes 1, 2, 3, and 4 as the privacy-related regions.

Meanwhile, although the faces are considered as the privacy-related regions in the above example, texts related to the personal information e.g., descriptions and addresses, exposed in the original image may also be detected and set as the privacy-related regions by the deep learning-based image network.

Next, the labeling device 1000 may add one or more dummy regions, different from the detected privacy-related regions, onto the original image, to thereby set the privacy-related regions and the dummy regions as obfuscation-expected regions which represent regions to be obfuscated in the original image, at a step of S20.

That is, when at least one training image is generated according to the conventional techniques, correlations between obfuscated parts and labels are inevitable, therefore the learning network is trained to get a correct answer in response to finding the obfuscated parts only and accordingly the learning network has a problem in not being able to generate the correct answer for the original image without the obfuscated parts. Herein, the labels may be correct values, i.e., values generated by labeling ground truths for the original image, corresponding to a task of the learning network using the training image.

In order to prevent the above from happening, the present invention adds the dummy regions for the obfuscation-expected regions, thereby overcoming the correlation between the obfuscated parts and the labels, and accordingly, the learning network may get the correct answer even if the original image without the obfuscated parts is inputted thereto.

Meanwhile, if all of the dummy regions are overlapping with the labels and are located at the top right of the labels, or, although all of the dummy regions are not overlapping with the labels, if all or almost all of the dummy regions are located near the top right of the labels, e.g., within ten pixels, the dummy regions and the labels will be correlated with each other, therefore the added dummy regions should be positioned in the original image such that they do not generate correlations with the labels.

Herein, the labeling device 1000 may add the dummy regions onto the original image by performing either of (i) a process of adding the dummy regions onto one or more random locations randomly chosen within the original image and (ii) a process of adding the dummy regions onto one or more fixed locations determined grid-wise within the original image, such that correlation problems between the dummy regions and the labels may be resolved. Further, a specific dummy region among the dummy regions may be located at a location of at least a predetermined distance from at least one of the labels generated by labeling the obfuscated image. Herein, processes for generating the obfuscated image will be explained later. It is to be understood that the present disclosure is not limited by above methods, and the labeling device 1000 may add the dummy regions onto the original image through various methods that does not generate the correlation problems between the dummy regions and the labels.

Figure 3B:
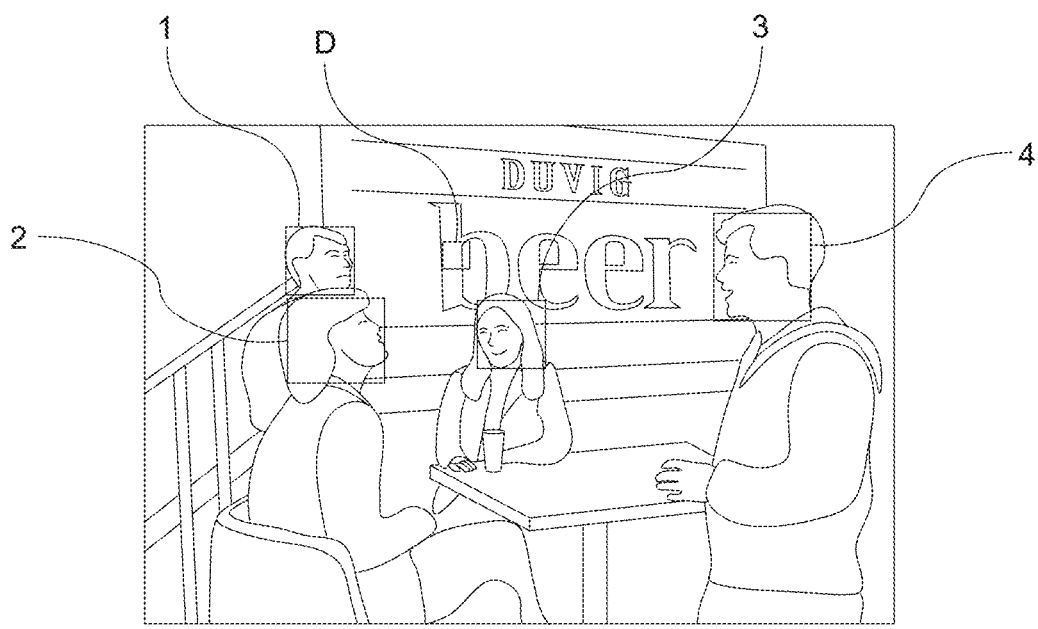

For example, referring to FIG. 3B, the labeling device 1000 may add the one or more dummy regions, e.g., a dummy region D, such that the dummy region D does not form correlations with each of the bounding boxes 1, 2, 3, and 4. Herein, only one dummy region is depicted in the FIG. 3B, however there may be a plurality of dummy regions. That is, by allowing each of the labels, including the bounding boxes 1, 2, 3, and 4, and the at least one dummy region D to be apart from each other by at least the predetermined distance, the correlation problems between the obfuscated parts and the labels may be resolved.

Figure 3C:
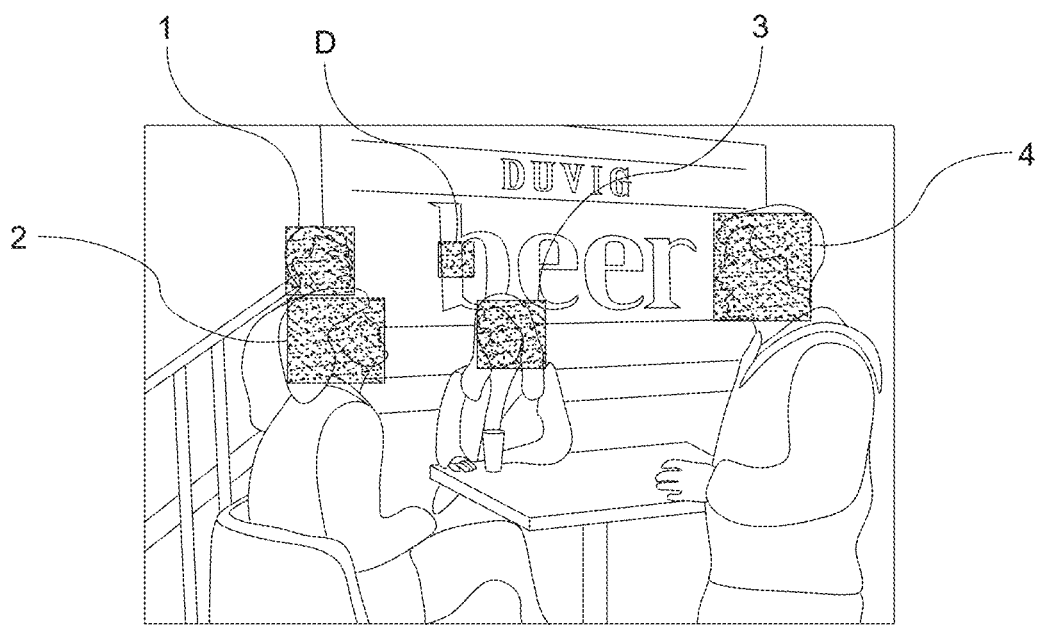

Next, the labeling device 1000 may obfuscate the obfuscation-expected regions within the original image to generate the obfuscated image, at a step of S30. For example, referring to FIG. 3C, the labeling device 1000 may generate the obfuscated image by obfuscating the obfuscation-expected regions, i.e., the bounding boxes 1, 2, 3, and 4 and the dummy region D, through an obfuscation algorithm or an obfuscation network.

Herein, the labeling device 1000 may use the obfuscation algorithm to perform a blanking process, a pixelizing process, a circle process, a blurring process, and a box process on the obfuscation-expected regions.

Further, the labeling device 1000 may use the obfuscation network which performs frequency manipulation to obfuscate the obfuscation-expected regions.

That is, the labeling device 1000 may perform either of (i) a process of inputting the original image being set with the obfuscation-expected regions into the obfuscation network, to thereby instruct the obfuscation network to filter frequency of the obfuscation-expected regions of the original image and thus generate the obfuscated image, and (ii) processes of (ii-1) cropping each of the obfuscation-expected regions of the original image to generate each of cropped images, (ii-2) inputting the cropped images into the obfuscation network to thereby instruct the obfuscation network to filter frequency of each of cropped images and thus generate each of cropped obfuscated images, and (ii-3) compositing each of the obfuscation-expected regions with each of the cropped obfuscated images to thus generate the obfuscated image. The obfuscation network that performs the manipulation of filtering the frequency will be explained in detail hereinafter.

Next, the labeling device 1000 may label the obfuscated image to be corresponding to the task of the learning network to be trained, to thereby generate the training image to be used in training the learning network, at a step of S40.

Herein, the labeling is performed in order to generate ground truth for training the learning network, and various labeling processes may be performed according to the task of the learning network to be trained. Further, the labeling to the obfuscated image may be achieved through auto-labeling or manual-labeling. In the latter case, the labeling device 1000 may send the obfuscated image to a human labeler so that he or she may label the obfuscated image.

Figure 3D:
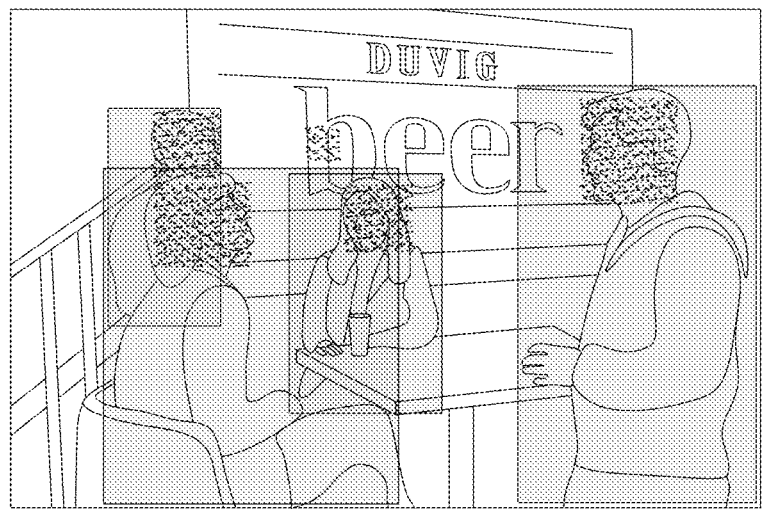
Figure 3E:
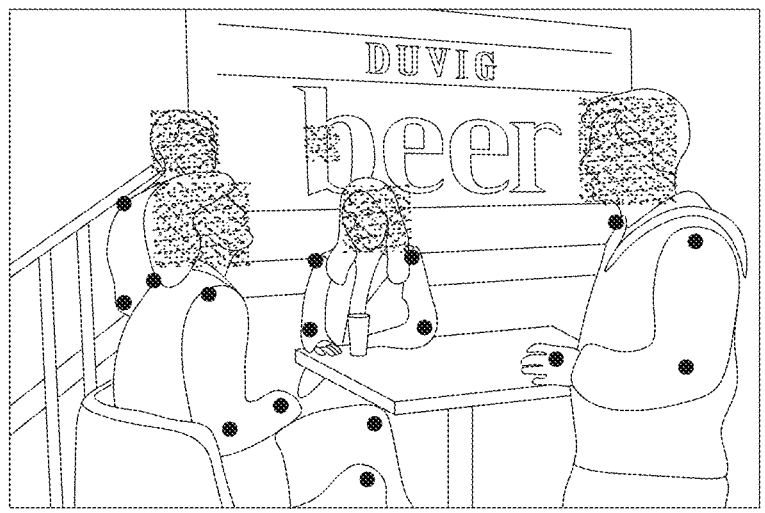

As an example, FIG. 3D illustrates a state of labeling bounding boxes for humans in order to detect the humans within the obfuscated image, and FIG. 3E illustrates a state of labeling body keypoints for the humans in order to detect the body keypoints within the obfuscated image.

In addition to the bounding boxes and the body keypoints, the obfuscated image may be labeled in various ways according to the task of the learning network, such as class information, segmentation information, etc.

Next, processes of generating the obfuscated image by obfuscating the obfuscation-expected regions including the one or more privacy-related regions and the one or more dummy regions are explained as follow.

First, the labeling device 1000 may input the training image generated through partial obfuscation as above, i.e., generated by obfuscating the obfuscation-expected regions, to the learning network, to thereby instruct the learning network to perform a learning operation on the training image and thus output first characteristic information to be corresponding to the task. Further, the labeling device 1000 may (i) generate a task loss by referring to the first characteristic information and its corresponding ground truth or a first task-specific output, generated by using the first characteristic information, and its corresponding ground truth, and (ii) train the learning network through a backpropagation of the task loss.

Contrary to above, the labeling device 1000 may not directly train the learning network, as the case may be. For example, the labeling device 1000 may send the training image to a learning device to allow the learning device to train the learning network.

That is, the labeling device 1000 may (i) transmit the training image to the learning device, to thereby instruct the learning device to input the training image to the learning network capable of performing the learning operation on the training image and thus acquire the first characteristic information, (ii) generate the task loss by referring to the first characteristic information and its corresponding ground truth or the first task-specific output, generated by using the first characteristic information, and its corresponding ground truth, and (iii) train the learning network through a back-propagation of the task loss.

Next, the labeling device 1000 may evaluate a trained learning network trained by using the original image through either of (i) processes of (i-1) inputting the original image to the trained learning network, to thereby instruct the trained learning network to perform the learning operation on the original image and thus output second characteristic information to be corresponding to the task, and (i-2) evaluating the trained learning network by referring to the second characteristic information and its corresponding ground truth or a second task-specific output, generated by using the second characteristic information, and its corresponding ground truth, and (ii) processes of (ii-1) transmitting the original image to the learning device, to thereby instruct the learning device to input the original image into the trained learning network to perform the learning operation on the original image and thus acquire the second characteristic information, and (ii-2) evaluating the trained learning network by referring to the second characteristic information and its corresponding ground truth or the second task-specific output, generated by using the second characteristic information, and its corresponding ground truth.

Meanwhile, detailed explanations on the obfuscation network capable of performing the manipulation of filtering the frequency will be explained below. Below, unlike the training image generated from the labeling device 1000 by performing the above processes, the training image may be a labeled original image.

A method for training the obfuscation network capable of obfuscating, e.g., anonymizing, concealing, or the like, the original image for privacy by using the learning device 2000 is described by referring to FIG. 4 as follows.

First, in response to acquiring the training image 10, the learning device 2000 may input the training image 10 into the obfuscation network 2100, to thereby instruct the obfuscation network 2100 to filter the frequency of the training image 10 and thus generate the obfuscated image 40.

For example, the obfuscation network 2100 may input the training image 10 into an encoding network 2110, to thereby instruct the encoding network 2110 to encode the training image 10 and thus generate encoded image.

Herein, the encoding network 2110 may encode the training image 10 to generate embeddings, i.e., the encoded image that is feature data acquired by encoding the training image 10. Further, the encoding network 2110 may be configured as a CNN (convolutional neural network), but it is not limited thereto.

Furthermore, the obfuscation network 2100 may input the encoded image into a high-pass filter 2120, to thereby instruct the high-pass filter 2120 to generate high-frequency image 20 by only allowing high-frequency regions in the encoded image to pass therethrough.

Herein, the high-frequency regions may be regions in which a degree of change in values of the training image 10 or the encoded image is determined as being larger than a first predetermined threshold. For example, the high-frequency regions may be regions in which a change in the intensity of the training image 10 or the encoded image is larger than a first predetermined intensity. The high-frequency regions may usually appear in edges, e.g., corners, of an object in the image.

Moreover, the obfuscation network 2100 may input the training image 10 into a low-pass filter 2130, to thereby instruct the low-pass filter 2130 to generate low-frequency image 30 by only allowing low-frequency regions in the training image 10 to pass therethrough.

Herein, the low-frequency regions may be regions in which a degree of change in values of the training image 10 or the encoded image is determined as being smaller than a second predetermined threshold. Herein, the second predetermined threshold is set as much smaller than the first predetermined threshold. For example, the low-frequency regions may be regions in which a change in the intensity of the training image 10 or the encoded image is smaller than a second predetermined intensity. The low-frequency regions may usually appear in a background of the image or inner areas of an object in the image.

Afterward, the obfuscation network 2100 may concatenate the high-frequency image 20 and the low-frequency image 30 to generate the obfuscated image 40.

Next, the learning device 2000 may input the obfuscated image 40 into the learning network 2500 designed to perform a specific task, to thereby instruct the learning network 2500 to generate characteristic information to be corresponding to the specific task by performing the learning operation on the obfuscated image 40 or generate a task-specific output by using the characteristic information.

Herein, the learning network 2500 may include a machine learning network, but the scope of the present disclosure is not limited thereto, and may include any learning networks capable of generating the characteristic information or the task-specific output by applying its learning operation to the obfuscated image 40. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be obfuscated, e.g., a subject to be anonymized or concealed, may be personal information included in the training image 10, i.e., the original image. Herein, the personal information may include any information related to a person, such as personal identification information, personal medical information, personal biometric information, personal behavioral information, etc.

And, the characteristic information may be features or logits corresponding to the obfuscated image 40. Also, the characteristic information may be feature values related to certain features in the obfuscated image 40, or the logits including values of at least one of vectors, matrices, and coordinates related to the certain features. For example, if the training image 10 is facial image data, the result above may be classes for face recognition, facial features, e.g., laughing expressions, coordinates of facial landmark points, e.g., both end points on far sides of an eye.

Meanwhile, the task-specific output may be an output of a task to be performed by the learning network 2500, and may have various results according to the task of the learning network 2500, such as a probability of a class for classification, coordinates resulting from regression for location detection, etc. Further, an activation function of an activation unit may be applied to the characteristic information outputted from the learning network 2500, to thereby generate the task-specific output according to the task to be performed by the learning network 2500. Herein, the activation function may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the learning network 2500 performs the task for the classification, the learning device 2000 may map the characteristic information outputted from the learning network 2500 onto each of classes, to thereby generate one or more probabilities of the obfuscated image 40 for each of the classes. Herein, each of the probabilities for each of the classes may represent each of probabilities of the characteristic information outputted from the learning network 2500 for each of the classes being true. For example, if the training image 10 is the facial image data, a probability of the face having a laughing expression may be outputted as 0.75, and a probability of the face not having the laughing expression may be outputted as 0.25, and the like. Herein, a softmax algorithm may be used for mapping the characteristic information outputted from the learning network 2500 onto each of the classes, but the scope of the present disclosure is not limited thereto, and various algorithms may be used for mapping the characteristic information onto each of the classes.

Next, the learning device 2000 may generate the task loss by referring to the characteristic information outputted from the learning network 2500 and its corresponding ground truth or the task-specific output, generated by using the characteristic information, and its corresponding ground truth and train at least one of the learning network 2500 and the obfuscation network 2100 through a backpropagation of the task loss.

Herein, in the case of the obfuscation network 2100 is comprised of the encoding network 2110, the high-pass filter 2120, and the low-pass filter 2130, the learning device 2000 may sequentially train the learning network 2500 and the encoding network 2110.

For example, the learning device 2000 may (i) input the obfuscated image 40 into the learning network 2500, to thereby instruct the learning network 2500 to generate the first characteristic information or the first task-specific output, generated by using the first characteristic information, by performing the learning operation on the obfuscated image 40, (ii) generate the first task loss by referring to (ii-1) the first characteristic information and its corresponding ground truth or (ii-2) the first task-specific output, generated by using the first characteristic information, and its corresponding ground truth, and (iii) train the learning network 2500 through a backpropagation of the first task loss, thereby allowing the learning network 2500 to be the trained learning network.

Further, the learning device 2000 may (i) input the obfuscated image 40 into the trained learning network, to thereby instruct the trained learning network to generate the second characteristic information or the second task-specific information, generated by using the second characteristic information, by performing the learning operation on the obfuscated image 40, (ii) generate the second task loss by referring to (ii-1) the second characteristic information and its corresponding ground truth or (ii-2) the second task-specific output, generated by using the second characteristic information, and its corresponding ground truth, and (iii) train the encoding network 2110 through a backpropagation of the second task loss.

The method of training the obfuscation network 2100 using one learning network 2500 designed to perform the specific task is described above, however, contrary to above, it is also possible to train the obfuscation network 2100 using multiple learning networks 2500 that are designed to perform different tasks.

From the above method, the obfuscation network 2100 may obfuscate any inputted image so that humans cannot recognize the inputted image from the obfuscated image 40, but the learning network 2500 can. Additionally, the learning network 2500 may recognize the obfuscated image 40, i.e., the obfuscated training image, as same as or similar to the training image.

It is appreciated that although FIG. 4 illustrates the obfuscation network 2100 comprised of the encoding network 2110, the high-pass filter 2120, and the low-pass filter 2130, the obfuscation network 2100 may be configured in other various ways.

That is, as illustrated in FIGS. 5 and 6, instead of using the high-pass filter 2120 and the low-pass filter 2130 as illustrated in FIG. 4, a band reject filter 2150 may be used to generate the obfuscated image 40. Herein, the band reject filter 2150 may remove one or more specific frequency bands in the inputted image. Herein, the specific frequency bands may be not only be a single-band region, but also a multiple-band region.

For example, referring to FIG. 5, the obfuscation network 2100 may input the training image 10 into the encoding network 2110, to thereby instruct the encoding network 2110 to encode the training image 10 and thus generate the encoded image. Further, the obfuscation network 2100 may input the encoded image into the band reject filter 2150, to thereby instruct the band reject filter 2150 to remove one or more predetermined frequency bands, that is, the specific frequency bands in the encoded image and thus generate the obfuscated image 40.

As another example, referring to FIG. 6, the obfuscation network 2100 may input the training image 10 into the band reject filter 2150, to thereby instruct the band reject filter 2150 to remove the predetermined frequency bands, i.e., the specific frequency bands in the training image 10 and thus generate frequency-obfuscated image. Further, the obfuscation network 2100 may input the frequency-obfuscated image into the encoding network 2110, to thereby instruct the encoding network 2110 to encode the frequency-obfuscated image and thus generate the obfuscated image 40.

It is appreciated that although FIGS. 4 to 6 illustrate the obfuscation network 2100 to include the encoding network 2110, the obfuscation network 2100 may be configured as only the high-pass filter 2120 and the low-pass filter 2130.

For example, by referring to FIG. 7, the obfuscation network 2100 may input the training image 10 into the high-pass filter 2120, to thereby instruct the high-pass filter 2120 to generate high-frequency image 20 by only allowing the high-frequency regions in the training image 10 to pass therethrough.

Moreover, the obfuscation network 2100 may input the training image 10 into the low-pass filter 2130, to thereby instruct the low-pass filter 2130 to generate low-frequency image 30 by only allowing the low-frequency regions in the training image 10 to pass therethrough.

Afterward, the obfuscation network 2100 may concatenate the high-frequency image 20 and the low-frequency image 30 to thereby generate the obfuscated image 40.

The high-pass filter 2120 and the low-pass filter 2130 in FIG. 4 and FIG. 7 may reject the single-band region or reject the multi-band regions according to a set value of high-frequency and/or a set value of low frequency.

Additionally, a threshold for filtering the frequency illustrated in FIGS. 4 to 7 may be set by various methods, and may be set such that the personal information of the inputted image is removed.

For example, by checking a range of the frequency to be used for removing the personal information, etc. in advance to set a fixed threshold, it is possible to remove the personal information, etc. from the inputted image through the single-band of frequency, the multi-band of frequency, and the arbitrary set of frequency, etc. by using the fixed threshold.

Also, it is possible to remove the personal information, etc. from the inputted image by using a dynamic threshold, i.e., a threshold value that can change depending on circumstances. For example, the threshold may be changed according to a size of the input image by using a linear relationship between the size of the input image and the threshold, or according to contents of the original image.

Furthermore, the threshold may be updated through training. For example, it is possible to train a threshold parameter targeted to generating a well obfuscated image. Herein, the well obfuscated image may be an outputted result from the obfuscation network through filtering the frequency using the threshold obtained by the trained threshold parameter. For instance, should filtering the threshold of 60 to 80 Hz of the training image produces the obfuscated image that is not suitable, the threshold parameters are trained so that the threshold of 60 to 80 Hz is not used to obfuscate the training image. On the contrary, should filtering the threshold of 30 to 40 Hz of the training image produces the obfuscated image that is suitable, the threshold parameters are trained so that the threshold of 30 to 40 Hz is used to obfuscate the training image. The well obfuscated image may use the threshold obtained by the trained threshold parameter as GT (Ground Truth).

The processes of partially obfuscating the obfuscation-expected regions in the original image by the labeling device 1000 using the trained obfuscation network is explained hereinafter.

The labeling device 1000 may input the original image being set with the obfuscation-expected regions or the cropped images into the obfuscation network, to thereby instruct the obfuscation network to (i) generate each of encoded images by encoding each of the obfuscation-expected regions in the original image or each of the cropped images through the encoding network, (ii) generate high-frequency images by only allowing high-frequency regions in the encoded images to pass through the high-pass filter, (iii) generate low-frequency images by only allowing low-frequency regions in each of the obfuscation-expected regions to pass through the low-pass filter, and (iv) concatenate the high-frequency images and the low-frequency images, thereby obfuscating each of the obfuscation-expected regions.

Further, the labeling device 1000 may input the original image being set with the obfuscation-expected regions or the cropped images into the obfuscation network, to thereby instruct the obfuscation network to (i) generate the high-frequency images by only allowing the high-frequency regions in each of the obfuscation-expected regions of the original image or each of the cropped images to pass through the high-pass filter, (ii) generate the low-frequency images by only allowing the low-frequency regions in each of the obfuscation-expected regions to pass through the low-pass filter, and (iii) concatenate the high-frequency images and the low-frequency images, thereby obfuscating each of the obfuscation-expected regions.

Furthermore, the labeling device 1000 may input the original image being set with the obfuscation-expected regions or the cropped images into the obfuscation network, to thereby instruct the obfuscation network to (i) generate the encoded images by encoding each of the obfuscation-expected regions in the original image or each of the cropped images through the encoding network, and (ii) remove one or more predetermined frequency bands in each of the encoded images through the band reject filter, thereby obfuscating each of the obfuscation-expected regions.

Moreover, the labeling device 1000 may input the original image being set with the obfuscation-expected regions or the cropped images into the obfuscation network, to thereby instruct the obfuscation network to (i) generate frequency-obfuscated images by removing one or more predetermined frequency bands in each of the obfuscation-expected regions of the original images or each of the cropped images through the band reject filter, and (ii) encode the frequency-obfuscated images through the encoding network, thereby obfuscating each of the obfuscation-expected regions.

Meanwhile, the training image, which is generated by obfuscating and labeling the obfuscation-expected regions including the one or more dummy regions and the one or more privacy-related regions in accordance with one example embodiment of the present disclosure, may be provided or sold to a buyer of big data of images.

The present disclosure has an effect of generating the at least one training image to be used in training the learning network.

The present disclosure has another effect of generating the at least one obfuscated training image to be used in training the learning network such that the learning network operates correctly even with the at least one original image.

The present disclosure has still another effect of generating the obfuscated training image to be used in training the learning network to operate correctly regardless of whether the obfuscated parts are included.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high-level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for generating at least one training image to be used in training a learning network, comprising steps of:
    (a) a labeling device, in response to acquiring at least one original image, (i) inputting the original image into an image recognition network, to thereby instruct the image recognition network to detect one or more privacy-related regions from the original image, (ii) adding one or more dummy regions, different from the detected privacy-related regions, onto the original image, and (iii) setting the privacy-related regions and the dummy regions as obfuscation-expected regions which represent regions to be obfuscated in the original image;
    (b) the labeling device generating at least one obfuscated image by obfuscating the obfuscation-expected regions; and
    (c) the labeling device labeling the obfuscated image to be corresponding to a task of the learning network to be trained, to thereby generate the training image to be used in training the learning network.

2. The method of claim 1, further comprising steps of:
    (d) the labeling device training the learning network using the training image by performing either of processes of (i) (i-1) inputting the training image to the learning network, to thereby instruct the learning network to perform a learning operation on the training image and thus output first characteristic information to be corresponding to the task, (i-2) generating a task loss by referring to the first characteristic information and its corresponding ground truth or a first task-specific output, generated by using the first characteristic information, and its corresponding ground truth, and (i-3) training the learning network through a backpropagation of the task loss, and processes of (ii) (ii-1) transmitting the training image to a learning device, to thereby instruct the learning device to input the training image into the learning network to perform the learning operation on the training image and thus acquire the first characteristic information, (ii-2) generating the task loss by referring to the first characteristic information and its corresponding ground truth or the first task-specific output, generated by using the first characteristic information, and its corresponding ground truth, and (ii-3) training the learning network through a backpropagation of the task loss; and
    (e) the labeling device evaluating a trained learning network using the original image by performing either of processes of (i) (i-1) inputting the original image to the trained learning network, to thereby instruct the trained learning network to perform the learning operation on the original image and thus output second characteristic information to be corresponding to the task, and (i-2) evaluating the trained learning network by referring to the second characteristic information and its corresponding ground truth or a second task-specific output, generated by using the second characteristic information, and its corresponding ground truth, and processes of (ii) (ii-1) transmitting the original image to the learning device, to thereby instruct the learning device to input the original image into the trained learning network to perform the learning operation on the original image and thus acquire the second characteristic information, and (ii-2) evaluating the trained learning network by referring to the second characteristic information and its corresponding ground truth or the second task-specific output, generated by using the second characteristic information, and its corresponding ground truth.

3. The method of claim 1, wherein, at the step of (a), the labeling device adds the dummy regions onto the original image by performing either of a process of (i) adding the dummy regions onto one or more random locations randomly chosen within the original image and a process of (ii) adding the dummy regions onto one or more fixed locations determined grid-wise within the original image.

4. The method of claim 1, wherein a specific dummy region among the dummy regions is located by at least a predetermined distance from one or more labels generated by labeling the obfuscated image at the step of (c).

5. The method of claim 1, wherein, at the step of (b), the labeling device performs at least one of a blanking process, a pixelizing process, a circle process, a blurring process, and a box process on the obfuscation-expected regions by using obfuscation algorithm, to thereby obfuscate the obfuscation-expected regions.

6. The method of claim 1, wherein, at the step of (b), the labeling device generates the obfuscated image by performing either of processes of (i) inputting the original image being set with the obfuscation-expected regions into an obfuscation network, to thereby instruct the obfuscation network to filter frequency of the obfuscation-expected regions of the original image and thus generate the obfuscated image, processes of (ii) (ii-1) cropping each of the obfuscation-expected regions of the original image to generate each of cropped images, (ii-2) inputting the cropped images into the obfuscation network to thereby instruct the obfuscation network to filter frequency of each of cropped images and thus generate each of cropped obfuscated images, and (ii-3) compositing each of the obfuscation-expected regions with each of cropped obfuscated images to thus generate the obfuscated image.

7. The method of claim 6, wherein the labeling device inputs the original image being set with the obfuscation-expected regions or the cropped images into the obfuscation network, to thereby instruct the obfuscation network to (i) generate each of encoded images by encoding each of the obfuscation-expected regions in the original image or each of the cropped images through an encoding network, (ii) generate high-frequency images by only allowing high-frequency regions in the encoded images to pass through a high-pass filter, (iii) generate low-frequency images by only allowing low-frequency regions in each of the obfuscation-expected regions to pass through a low-pass filter, and (iv) concatenate the high-frequency images and the low-frequency images, thereby obfuscating each of the obfuscation-expected regions.

8. The method of claim 6, wherein the labeling device inputs the original image being set with the obfuscation-expected regions or the cropped images into the obfuscation network, to thereby instruct the obfuscation network to (i) generate high-frequency images by only allowing high-frequency regions in each of the obfuscation-expected regions of the original image or each of the cropped images to pass through a high-pass filter, (ii) generate low-frequency images by only allowing low-frequency regions in each of the obfuscation-expected regions to pass through a low-pass filter, and (iii) concatenate the high-frequency images and the low-frequency images, thereby obfuscating each of the obfuscation-expected regions.

9. The method of claim 6, wherein the labeling device inputs the original image being set with the obfuscation-expected regions or the cropped images into the obfuscation network, to thereby instruct the obfuscation network to (i) generate encoded images by encoding each of the obfuscation-expected regions in the original image or each of the cropped images through an encoding network, and (ii) remove one or more predetermined frequency bands in each of the encoded images through a band reject filter, thereby obfuscating each of the obfuscation-expected regions.

10. The method of claim 6, wherein the labeling device inputs the original image being set with the obfuscation-expected regions or the cropped images into the obfuscation network, to thereby instruct the obfuscation network to (i) generate frequency-obfuscated images by removing one or more predetermined frequency bands in each of the obfuscation-expected regions of the original images or each of the cropped images through a band reject filter, and (ii) encode the frequency-obfuscated images through an encoding network, thereby obfuscating each of the obfuscation-expected regions.

11. A labeling device for generating at least one training image to be used in training a learning network, comprising:
at least one memory that stores instructions; and
at least one processor configured to execute the instructions to perform: processes of (I) in response to acquiring at least one original image, (i) inputting the original image into an image recognition network, to thereby instruct the image recognition network to detect one or more privacy-related regions from the original image, (ii) adding one or more dummy regions, different from the detected privacy-related regions, onto the original image, and (iii) setting the privacy-related regions and the dummy regions as obfuscation-expected regions which represent regions to be obfuscated in the original image; (II) generating at least one obfuscated image by obfuscating the obfuscation-expected regions; and (III) labeling the obfuscated image to be corresponding to a task of the learning network to be trained, to thereby generate the training image to be used in training the learning network.

12. The labeling device of claim 11, wherein the processor further performs processes of (IV) training the learning network using the training image by performing either of processes of (i) (i-1) inputting the training image to the learning network, to thereby instruct the learning network to perform a learning operation on the training image and thus output first characteristic information to be corresponding to the task, (i-2) generating a task loss by referring to the first characteristic information and its corresponding ground truth or a first task-specific output, generated by using the first characteristic information, and its corresponding ground truth, and (i-3) training the learning network through a backpropagation of the task loss, and processes of (ii) (ii-1) transmitting the training image to a learning device, to thereby instruct the learning device to input the training image into the learning network to perform the learning operation on the training image and thus acquire the first characteristic information, (ii-2) generating the task loss by referring to the first characteristic information and its corresponding ground truth or the first task-specific output, generated by using the first characteristic information, and its corresponding ground truth, and (ii-3) training the learning network through a backpropagation of the task loss; and (V) evaluating a trained learning network using the original image by performing either of processes of (i) (i-1) inputting the original image to the trained learning network, to thereby instruct the trained learning network to perform the learning operation on the original image and thus output second characteristic information to be corresponding to the task, and (i-2) evaluating the trained learning network by referring to the second characteristic information and its corresponding ground truth or a second task-specific output, generated by using the second characteristic information, and its corresponding ground truth, and processes of (ii) (ii-1) transmitting the original image to the learning device, to thereby instruct the learning device to input the original image into the trained learning network to perform the learning operation on the original image and thus acquire the second characteristic information, and (ii-2) evaluating the trained learning network by referring to the second characteristic information and its corresponding ground truth or the second task-specific output, generated by using the second characteristic information, and its corresponding ground truth.

13. The labeling device of claim 11, wherein the processor, at the process of (I), adds the dummy regions onto the original image by performing either of a process of (i) adding the dummy regions onto one or more random locations randomly chosen within the original image and a process of (ii) adding the dummy regions onto one or more fixed locations determined grid-wise within the original image.

14. The labeling device of claim 11, wherein a specific dummy region among the dummy regions is located by at least a predetermined distance from one or more labels generated by labeling the obfuscated image at the process of (III).

15. The labeling device of claim 11, wherein the processor, at the process of (II), performs at least one of a blanking process, a pixelizing process, a circle process, a blurring process, and a box process on the obfuscation-expected regions by using obfuscation algorithm, to thereby obfuscate the obfuscation-expected regions.

16. The labeling device of claim 11, wherein the processor, at the process of (II), generates the obfuscated image by performing either of processes of (i) inputting the original image being set with the obfuscation-expected regions into an obfuscation network, to thereby instruct the obfuscation network to filter frequency of the obfuscation-expected regions of the original image and thus generate the obfuscated image, processes of (ii) (ii-1) cropping each of the obfuscation-expected regions of the original image to generate each of cropped images, (ii-2) inputting the cropped images into the obfuscation network to thereby instruct the obfuscation network to filter frequency of each of cropped images and thus generate each of cropped obfuscated images, and (ii-3) compositing each of the obfuscation-expected regions with each of cropped obfuscated images to thus generate the obfuscated image.

17. The labeling device of claim 16, wherein the processor inputs the original image being set with the obfuscation-expected regions or the cropped images into the obfuscation network, to thereby instruct the obfuscation network to (i) generate each of encoded images by encoding each of the obfuscation-expected regions in the original image or each of the cropped images through an encoding network, (ii) generate high-frequency images by only allowing high-frequency regions in the encoded images to pass through a high-pass filter, (iii) generate low-frequency images by only allowing low-frequency regions in each of the obfuscation-expected regions to pass through a low-pass filter, and (iv) concatenate the high-frequency images and the low-frequency images, thereby obfuscating each of the obfuscation-expected regions.

18. The labeling device of claim 16, wherein the processor inputs the original image being set with the obfuscation-expected regions or the cropped images into the obfuscation network, to thereby instruct the obfuscation network to (i) generate high-frequency images by only allowing high-frequency regions in each of the obfuscation-expected regions of the original image or each of the cropped images to pass through a high-pass filter, (ii) generate low-frequency images by only allowing low-frequency regions in each of the obfuscation-expected regions to pass through a low-pass filter, and (iii) concatenate the high-frequency images and the low-frequency images, thereby obfuscating each of the obfuscation-expected regions.

19. The labeling device of claim 16, wherein the processor inputs the original image being set with the obfuscation-expected regions or the cropped images into the obfuscation network, to thereby instruct the obfuscation network to (i) generate encoded images by encoding each of the obfuscation-expected regions in the original image or each of the cropped images through an encoding network, and (ii) remove one or more predetermined frequency bands in each of the encoded images through a band reject filter, thereby obfuscating each of the obfuscation-expected regions.

20. The labeling device of claim 16, wherein the processor inputs the original image being set with the obfuscation-expected regions or the cropped images into the obfuscation network, to thereby instruct the obfuscation network to (i) generate frequency-obfuscated images by removing one or more predetermined frequency bands in each of the obfuscation-expected regions of the original images or each of the cropped images through a band reject filter, and (ii) encode the frequency-obfuscated images through an encoding network, thereby obfuscating each of the obfuscation-expected regions.

* * * * *